Dec. 15, 1931.  H. GAGE  1,837,155
FERTILIZER DISTRIBUTOR
Filed May 3, 1928   2 Sheets-Sheet 2

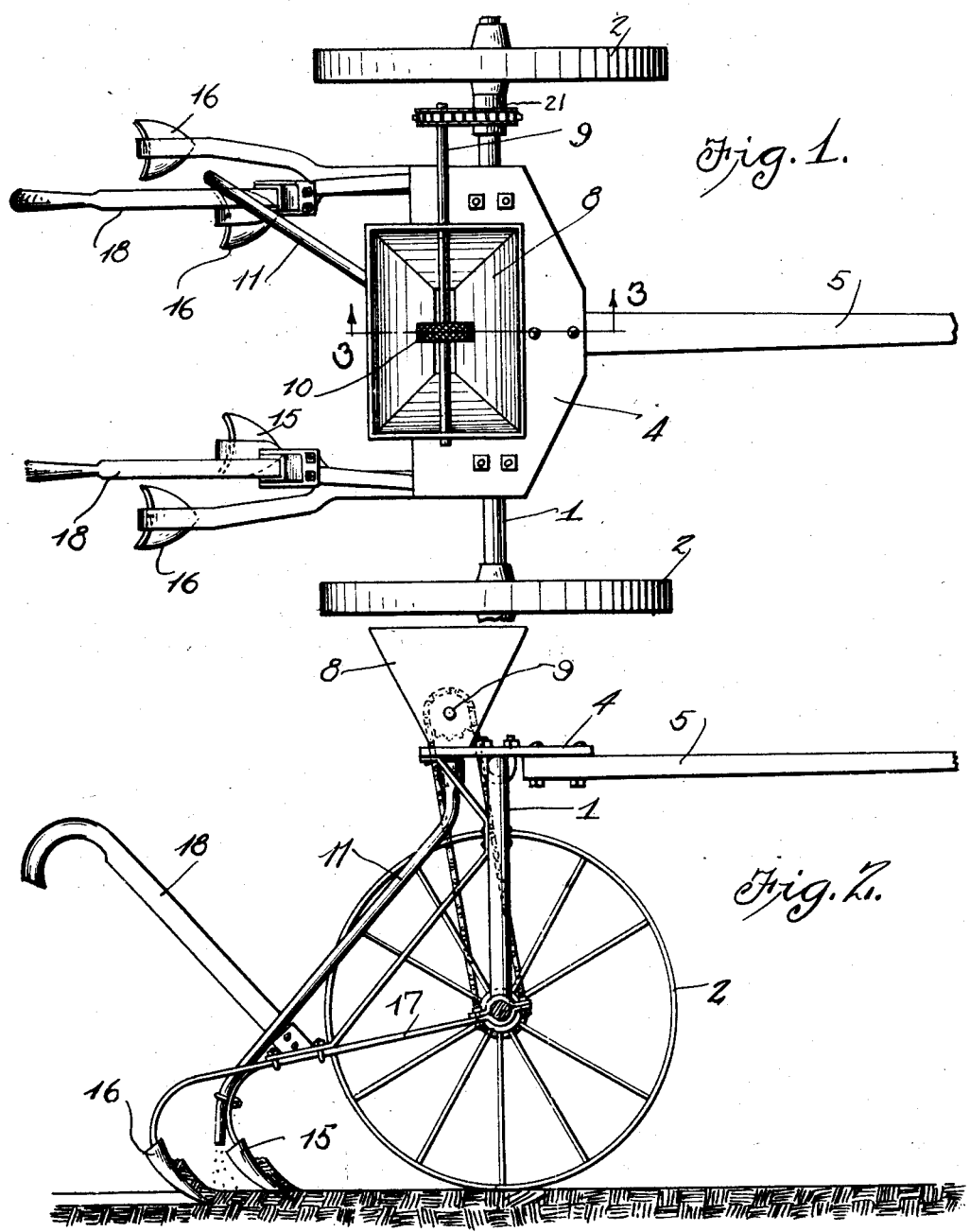

INVENTOR.
Hosa Gage.
BY
ATTORNEY.

Patented Dec. 15, 1931

1,837,155

UNITED STATES PATENT OFFICE

HOSA GAGE, OF MINDEN, TEXAS

FERTILIZER DISTRIBUTOR

Application filed May 3, 1928. Serial No. 274,883.

This invention has relation to implements for cultivating and fertilizing the soil and has for its object the production of an implement by which both operations can be carried on at the same time, thus saving labor, time and expense incident to the use of separate and independent implements for accomplishing the same result.

A further object of this invention is to provide means whereby a cultivator of the usual construction and operation can be made to function as a fertilizer distributor, to be used in the latter capacity either during the act of cultivating growing plants or at other times, and whereby the implement may be used alternately as a cultivator solely or as a fertilizer solely as well as in other capacities.

A further object of the invention is to provide a cultivator of the foregoing character wherein the distributing hopper is mounted upon a platform, the hopper being capable of use as an operator's seat while the forwardly projecting edge of the platform constitutes a foot rest.

Heretofore it has been customary to cultivate the soil around growing plants at one time period and by means of a cultivating implement capable of cultivating only, and to then, at any period thereafter, distribute the fertilizer by means of a separate fertilizer distributor constructed and adapted for this single purpose.

The purpose and function of the present invention is to so construct an implement of, essentially, the cultivator type that at one operation and through the instrumentality of a single cultivating implement the soil may be plowed around or at the sides of the growing plants, the fertilizer distributed, and the soil again plowed so as to cover the fertilizing material.

An implement embodying my invention comprises a cultivator of the wheel type having one or more cultivating plow shares so positioned that in cultivating a row one share of a pair will be in advance of the other a sufficient distance to permit of the deposit of the fertilizing material immediately after the plowing operation of the first share and before the following share has turned the soil. The described implement further embodies a hopper or hoppers to contain fertilizing material provided with means for storing and expelling the fertilizing material, and for conducting the same to the point of intended distribution.

With these objects in view, the invention consists of an implement constructed and adapted to successively cultivate the soil by means of a plow, deposit fertilizing material upon the plowed soil, and then plowing the soil over the deposit.

The invention further consists in the structural features, combinations hereinafter more particularly described and recited in the claim.

In the accompanying drawings which illustrate a combined cultivator and drill fertilizer:

Figure 1 is a plan view of the implement, of one construction;

Figure 2 is a vertical longitudinal sectional view of the same;

Figure 3:
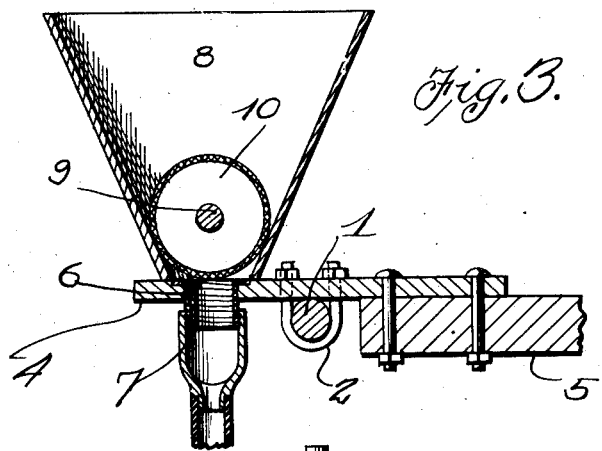
Figure 3 is a vertical, longitudinal section, on an enlarged scale of the fertilizer hopper, on line 3—3 of Figure 1.

The implement which is of the wheel cultivator type comprises an axle 1, of approximately U-shape, upon the spindles of which are mounted the traction wheels 2, 2. The axle 1 is attached by staples 3 to a platform 4, to the forward portion of which is secured the tongue 5. This platform has a vertical aperture 6 in which is arranged a spout 7. Above this spout, and communicating therewith, through a bottom opening is a hopper 8, which when covered by a lid may be used as a seat for the driver. The hopper 8 is mounted on the rear portion of the platform 4 with the forwardly extending end of the platform constituting a foot rest for the operator.

A horizontal shaft 9 passes transversely through the hopper 8 and has keyed thereon, within the hopper a rotary stirrer 10 constructed and adapted to agitate the contents of the hopper and feed the same to the bottom outlet. A tube or hose 11 is connected to the spout 7 of the hopper and is run downward rearwardly of the same to a point slightly above the surface of the ground as illustrated clearly in Figure 2.

The shaft 9 is driven from the hub or hubs 21 of the wheel or wheels 2, 2, by chain and sprocket connections 12, 12.

The plow shares 15, 16 are attached to a beam 17, which in turn is secured to the axle 8. This beam is bifurcated and its share holding branches spaced apart laterally. The shares 15 are arranged somewhat in advance of the shares 16 and they are out of alignment with each other as clearly shown in Figures 1 and 4.

The plow or cultivator handles designated by the reference numerals 18 are secured to the plow beams and project rearwardly of the axle and hopper.

Where the implement is provided with a single hopper as shown in Fig. 1, and leading therefrom a single distributing tube, it may be used for cultivating and distributing fertilizer to a single row of plants.

Figure 4:
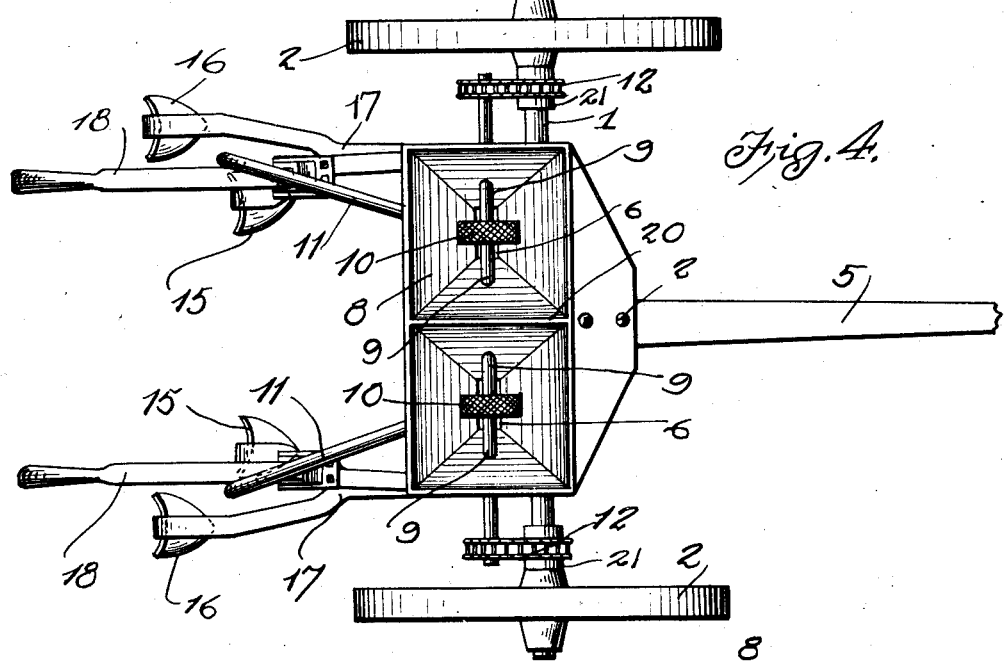
Figure 4 is a plan view of a modified construction of the implement, embodying twin hoppers for fertilizing material.
Figure 5:
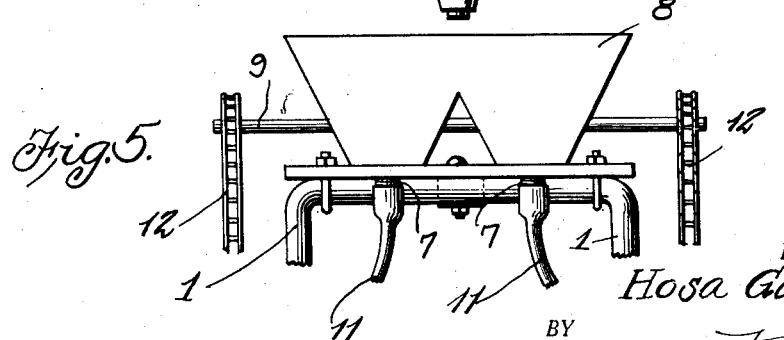
Figure 5 is an end elevation in part of the implement shown in Figure 4.

With the implement shown in Figures 4 and 5, the hopper is separated by a partition 20 into two compartments, each provided with a stirring wheel. A separate tube or hose leads from each compartment to each line of deposit or distribution, so that two lines or rows may be cultivated and fertilized at the same time.

As shown in the drawings the distributing spout or hose terminates at a point between the plow shares, that is rearwardly of the first plow 15 and forwardly of the share 16, so that when the implement is driven forward, the share 15 will plow up and cultivate the soil at one side of the row of plants, and will be followed first by the distributing tube or drill and then by the share 16, which will cover the deposited fertilizer with soil in the usual way.

As the principal features of this invention comprise a hopper adapted for the reception and discharge of fertilizing material, drill tubes for the distribution of the material located and directed to required points it is obvious that these features may be added to any cultivating implement having the plows so situated relatively that the fertilizer will be deposited between those of a pair and will be covered or plowed under by the rearmost of a pair of shares.

I claim:—

A fertilizer distributor and cultivator, comprising a vehicle mounted on traction wheels, an axle for said wheels, a platform carried by the axle, a hopper mounted on the rear end of the platform and forming an operator's seat and the forward end of the platform forwardly of the hopper constituting a foot rest, a draft tongue attached to the forward end of the platform, a plow beam secured to the axle and bifurcated at its rear portion, plow beams attached to the bifurcated portions and arranged in spaced apart and tandem relation so as to straddle a row, distributing tubes leading from the hopper rearwardly and attached to the plow beams between the shares and rearwardly of the advanced share so that in one operation the machine will successively plow a furrow, deposit fertilizing material therein and cover the same.

In testimony whereof I affix my signature.

HOSA GAGE.